United States Patent
Minamiura et al.

(10) Patent No.: US 11,923,550 B2
(45) Date of Patent: Mar. 5, 2024

(54) CATALYST LAYER FOR FUEL CELL, AND FUEL CELL

(71) Applicant: PANASONIC INTELLECTUAL PROPERTY MANAGEMENT CO., LTD., Osaka (JP)

(72) Inventors: Takeshi Minamiura, Osaka (JP); Hitoshi Ishimoto, Hyogo (JP); Shinichiro Imura, Hyogo (JP); Kazuya Yamasaki, Osaka (JP); Yukihiro Shimasaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/957,450

(22) PCT Filed: Dec. 26, 2018

(86) PCT No.: PCT/JP2018/047730
§ 371 (c)(1),
(2) Date: Jun. 24, 2020

(87) PCT Pub. No.: WO2019/131707
PCT Pub. Date: Jul. 4, 2019

(65) Prior Publication Data
US 2021/0075024 A1    Mar. 11, 2021

(30) Foreign Application Priority Data
Dec. 28, 2017  (JP) ................. 2017-254978

(51) Int. Cl.
*H01M 4/88*     (2006.01)
*H01M 4/86*     (2006.01)
(Continued)

(52) U.S. Cl.
CPC ....... *H01M 4/9083* (2013.01); *H01M 4/8673* (2013.01); *H01M 4/8807* (2013.01);
(Continued)

(58) Field of Classification Search
None
See application file for complete search history.

(56) References Cited

U.S. PATENT DOCUMENTS

| | | | |
|---|---|---|---|
| 2003/0082308 A1* | 5/2003 | Kinoshita | H01M 8/1004 427/407.1 |
| 2010/0075201 A1* | 3/2010 | Nakanishi | H01M 4/92 429/434 |

(Continued)

FOREIGN PATENT DOCUMENTS

| | | |
|---|---|---|
| CN | 105552413 A | 5/2016 |
| JP | H03-145062 A | 6/1991 |

(Continued)

OTHER PUBLICATIONS

International Search Report and Written Opinion issued in International Patent Application No. PCT/JP2018/047730, dated Mar. 26, 2019; with partial English translation.

(Continued)

*Primary Examiner* — Jonathan Crepeau
(74) *Attorney, Agent, or Firm* — Rimon P.C.

(57) ABSTRACT

The preset disclosure provides a catalyst layer that has a small contact resistance with a gas diffusion layer and excellent gas diffusion properties. The catalyst layer for a fuel cell has a uniform thickness and includes fibrous conductive members and catalyst particles. The fibrous conductive members are inclined relative to a surface direction of the catalyst layer, and a lengthwise direction of the fibrous conductive members, on average, matches a first direction.

7 Claims, 4 Drawing Sheets

(51) Int. Cl.
    *H01M 4/90*           (2006.01)
    *H01M 4/92*           (2006.01)
    *H01M 8/0258*       (2016.01)
    *H01M 8/1004*       (2016.01)

(52) U.S. Cl.
    CPC .......... *H01M 4/881* (2013.01); *H01M 4/926* (2013.01); *H01M 8/0258* (2013.01); *H01M 8/1004* (2013.01)

(56) References Cited

U.S. PATENT DOCUMENTS

| | | | |
|---|---|---|---|
| 2014/0302419 A1 | 10/2014 | Nanba et al. | |
| 2016/0118670 A1* | 4/2016 | Mizutani | H01M 4/9075 429/482 |

FOREIGN PATENT DOCUMENTS

| | | | |
|---|---|---|---|
| JP | 2001-283878 | A | 10/2001 |
| JP | 2007-257886 | A | 10/2007 |
| JP | 2009-140764 | A | 6/2009 |
| JP | 2009-152128 | A | 7/2009 |
| JP | 2010-205428 | * | 9/2010 |
| JP | 2013-191435 | A | 9/2013 |
| JP | 5278042 | B2 | 9/2013 |
| JP | 2013-206543 | A | 10/2013 |
| JP | 2014-154350 | A | 8/2014 |
| WO | 2013/065396 | A1 | 5/2013 |

OTHER PUBLICATIONS

Chinese Office Action issued in Chinese Patent Application No. 201880083829.9, dated Oct. 22, 2021.

Chinese Office Action issued in the corresponding Chinese Patent Application No. 201880083829.9, dated Mar. 23, 2022.

* cited by examiner

CATALYST LAYER FOR FUEL CELL, AND FUEL CELL

CROSS-REFERENCE OF RELATED APPLICATIONS

This application is the U.S. National Phase under 35 U.S.C. § 371 of International Patent Application No. PCT/JP2018/047730, filed on Dec. 26, 2018, which in turn claims the benefit of Japanese Application No. 2017-254978, filed on Dec. 28, 2017, the entire disclosures of which Applications are incorporated by reference herein.

TECHNICAL FIELD

The present disclosure relates to a catalyst laver for a fuel cell, and a fuel cell.

BACKGROUND ART

A fuel cell includes a membrane electrode assembly that includes an electrolyte membrane and a pair of electrodes that sandwich the electrolyte membrane. Each of the pair of electrodes includes a catalyst layer and a gas diffusion layer in this order from the electrolyte membrane side.

Patent Literature 1 proposes a catalyst layer that contains conductive nano columnar bodies (hereinafter referred to simply as "columnar bodies") that are oriented in a direction substantially perpendicular to the surface direction of an electrolyte membrane (catalyst layer) and a catalyst supported by the columnar bodies, and an embedding prevention layer that is interposed between the catalyst layer and the electrolyte membrane.

The catalyst layer is formed by forming, on a substrate, columnar bodies that are oriented in a direction substantially perpendicular to the surface direction of the substrate by using a chemical vapor deposition method, and then transferring the columnar bodies on the substrate onto an electrolyte membrane. The embedding prevention laver is provided to suppress a reduction in catalyst utilization rate caused by the end portions of the columnar bodies embedding into the electrolyte membrane during transfer of the columnar bodies onto the electrolyte membrane.

Patent Literature 2 proposes, as in Patent Literature 1, a catalyst layer that contains conductive nano columnar bodies and a catalyst supported by the columnar bodies, wherein the columnar bodies are oriented at an inclination angle of 60° or less relative to the surface direction of an electrolyte membrane, and one ends of the columnar bodies are embedded into the electrolyte membrane.

Patent Literature 3 discloses a catalyst layer that contains long carbon fibers and a catalyst. Also, Patent Literature 3 proposes a configuration in which the long carbon fibers lying down on an electrolyte membrane are unidirectionally aligned and stacked, the catalyst layer is disposed such that the lengthwise direction of the long carbon fibers and the gas flow direction are perpendicular to each other, and the height to which the long carbon fibers are stacked is non-uniform in the gas flow direction. This generates a turbulent flow of gas, and thus gas diffusion properties in the catalyst layer can be enhanced.

CITATION LIST

Patent Literatures

[PTL 1] WO 2013/065396
[PTL 2] Laid-Open Patent Publication No. 2007-257886
[PTL 3] Laid-Open Patent Publication No. H3-145062

SUMMARY OF INVENTION

The columnar bodies of Patent Literature 1 are oriented in a direction substantially perpendicular to the surface direction of the catalyst layer (electrolyte membrane), and opposite end portions of the columnar bodies are in contact with the electrolyte membrane and the gas diffusion layer, respectively. On the other hand, during production of a membrane electrode assembly, a unit cell, or a stack body (cell stack) including a plurality of unit cells, an external force in the thickness direction of the membrane electrode assembly may be applied. If such an external force is applied, a problem may occur such as stress concentrating on the opposite end portions of the columnar bodies, which causes the columnar bodies to be bent and the end portions of the columnar bodies to penetrate into the electrolyte membrane and the gas diffusion layer. If such a problem occurs, voids (gas paths) are unevenly formed in the catalyst layer, and gas diffusion properties decrease in a portion of the catalyst layer.

The columnar bodies of Patent Literature 2 are obliquely oriented relative to the surface direction of the electrolyte membrane, and the electrolyte membrane-side ends of the columnar bodies are embedded into the electrolyte membrane. As described above, if an external force in the thickness direction of the columnar bodies is applied, the stress applied to the columnar bodies is directly applied to the electrolyte membrane, causing damage to the electrolyte membrane. Furthermore, if an external force in the thickness direction is applied as described above, because the columnar bodies are oriented in an oblique direction, the stress concentrates on the side surface portions of the columnar bodies, causing the columnar bodies to be bent. If the columnar bodies are bent, the distance between adjacent columnar bodies is shortened, causing gas paths to be unevenly distributed and leading to a reduction in gas diffusion properties.

In Patent Literature 3, the height to which the long carbon fibers are stacked (the thickness of the catalyst layer) is no-uniform, and thus this may reduce the contact area between the gas diffusion layer and the catalyst layer and increase the contact resistance between the gas diffusion layer and the catalyst layer. On the other hand, if the height to which the long carbon fibers are stacked is uniform, the contact resistance between the catalyst layer and the gas diffusion layer decreases, but gas diffusion properties in the thickness direction of the catalyst layer also decrease.

Also, if the catalyst layer of Patent Literature 3 in which the long carbon fibers lying down on the electrolyte membrane are aligned unidirectionally is used, and gas is caused to flow in the lengthwise direction of the long carbon fibers, gas diffusion properties in the surface direction of the catalyst layer are improved, but gas diffusion properties in the thickness direction of the catalyst layer are low.

One aspect of the present disclosure relates to a catalyst layer for a fuel cell, the catalyst layer having a uniform thickness and including: fibrous conductive members; and catalyst particles. The fibrous conductive members are inclined relative to a surface direction of the catalyst layer, and a lengthwise direction of the fibrous conductive members, on average, matches a first direction.

Another aspect of the present disclosure relates to a fuel cell including: a membrane electrode assembly; and a first separator and a second separator that sandwich the membrane electrode assembly. The membrane electrode assembly includes: an electrolyte membrane; and a first electrode and a second electrode that sandwich the electrolyte membrane. The first electrode includes a first catalyst layer and a first gas diffusion layer in this order from the electrolyte membrane side. The first catalyst layer is the above-described catalyst layer.

According to the present disclosure, it is possible to provide a catalyst layer that has a small contact resistance with a gas diffusion layer and has excellent gas diffusion properties. It is also possible to provide a fuel cell that has excellent output characteristics.

DESCRIPTION OF EMBODIMENTS

[Catalyst Layer for Fuel Cell]

A catalyst layer for a fuel cell according to an embodiment of the present disclosure has a uniform thickness, and includes fibrous conductive members and catalyst particles. The fibrous conductive members are inclined relative to a surface direction of the catalyst layer (electrolyte membrane), and a lengthwise direction of the fibrous conductive members, on average, matches a first direction.

The expression "a lengthwise direction of the fibrous conductive members, on average, matches a first direction" means that, when the catalyst layer is viewed from a direction perpendicular to the surface direction of the catalyst layer, an angle $\theta_{d1}$ (average angle) formed by a first reference line that extends in the first direction and the lengthwise direction of the fibrous conductive members is 30° or less.

Figure 1:
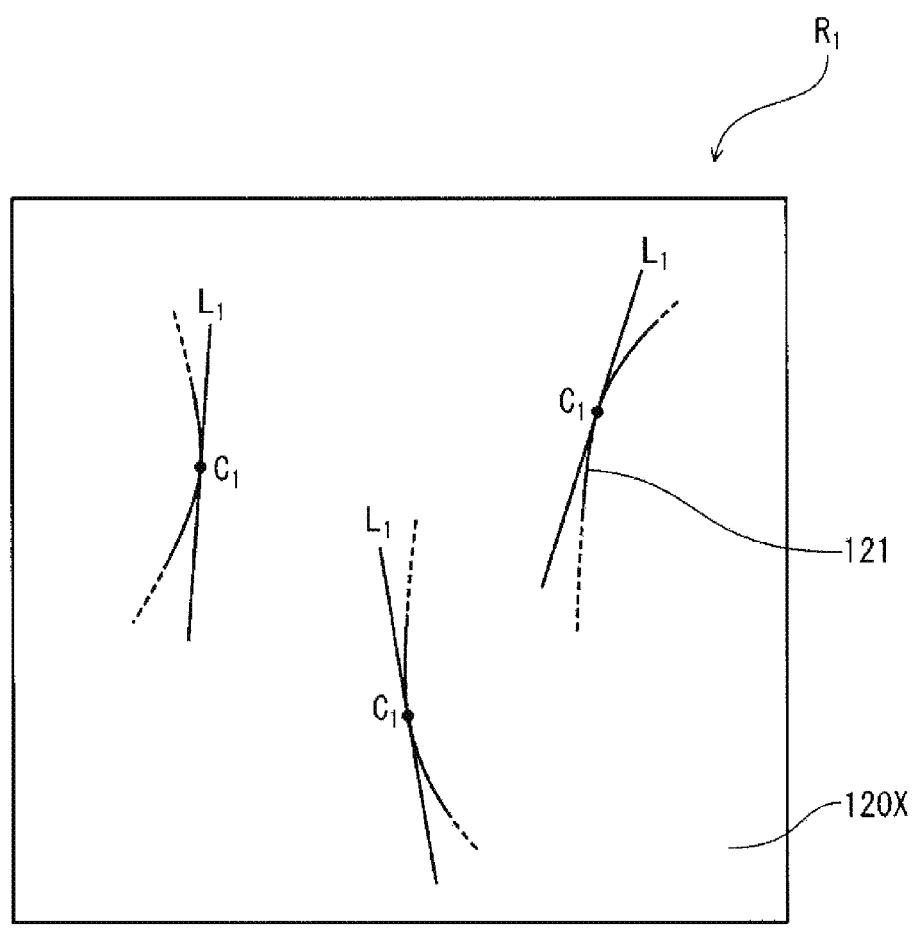
FIG. 1 is an illustrative diagram illustrating a method for determining a first reference line (first direction) by using a main surface of a catalyst layer.

The first reference line (first direction) is determined in the manner described below by using FIG. 1. FIG. 1 is an illustrative diagram illustrating a method for determining a first reference line (first direction) by using a main surface of a catalyst layer 120 (see FIG. 2). FIG. 1 shows only a few fibrous conductive members 121 in a region $R_1$ in a first main surface 120X on the gas diffusion layer side.

First, a gas diffusion layer is removed from a membrane electrode assembly 100 (see FIG. 4) to expose the first main surface 120X that is the gas diffusion layer-side surface of the catalyst layer 120. Then, an image of the first main surface 120X is captured using a scanning electron microscope (SEM).

In the obtained SEM image, a region that faces a gas flow path in the first main surface 120X of the catalyst layer 120 and in which, for example, 20 or more fibrous conductive members 121 can be observed is defined as region $R_1$ (50 μm×50 μm). 10 fibrous conductive members are arbitrarily selected from among the fibrous conductive members 121 that can be observed in the region $R_1$. Then, for each of the 10 fibrous conductive members 121, a tangent line $L_1$ passing through a midpoint C1 of an observable length is drawn.

Three regions $R_1$ are defined in the manner as described above such that the three regions $R_1$ do not overlap each other. Then, in each region $R_1$, 10 tangent lines $L_1$ are drawn in the same manner as described above. The orientations of a total of 30 tangent lines $L_1$ obtained are averaged, and the average orientation is defined as first direction, and a straight line that extends in the average orientation (first direction) is defined as first reference line $BL_1$.

In the case where the gas flow path has a serpentine shape or the like, and includes a plurality of linear portions, the three regions $R_1$ may be defined within a range that faces one linear portion in the first main surface 120X of the catalyst layer 120.

The angle $\theta_{d1}$ formed by the first reference line that extends in the first direction and the lengthwise direction of the fibrous conductive members when the catalyst layer is viewed from a direction perpendicular to the surface direction of the catalyst layer is obtained in the manner described below.

For each of the 30 tangent lines $L_1$ obtained above, the angle (0° or more and 90° or less) formed by the first reference fine $BL_1$ and the tangent line $L_1$ obtained above is measured. The average value of the measured angles is defined as angle $\theta_{d1}$. If the obtained angle $\theta_{d1}$ is 30° or less, it is determined that the lengthwise direction of the fibrous conductive members, on average, matches the first direction.

The expression "the fibrous conductive members are inclined relative to the surface direction of the catalyst of layer" means that the fibrous conductive members are present inclined relative to the surface direction of the catalyst layer, with the linearity of the fibrous conductive members being ensured. As used herein, the expression "the linearity of the fibrous conductive members is ensured" means that the fibrous conductive members are not bent significantly, and linearity parameter $L_p$ (average value), which is determined using a method described below, is 0.6 or more. From the viewpoint of further improving gas diffusion properties, the linearity parameter $L_p$ (average value) is preferably 0.7 or more.

Because the lengthwise direction of the fibrous conductive members, on average, matches the first direction, gas diffusion properties in the surface direction of the catalyst layer are improved. Also, as a result of the fibrous conductive members being inclined relative to the surface direction of the catalyst layer, good gas diffusion properties can also be obtained in a direction (thickness direction) perpendicular to the surface direction of the catalyst layer. In the catalyst layer described above, voids (gas paths) can be formed sufficiently in the catalyst layer, and thus gas can be effectively diffused in the entire catalyst layer.

Because the fibrous conductive members are inclined relative to the surface direction of the catalyst layer, bending of the fibrous conductive members, penetration of the fibrous conductive members into the electrolyte membrane, and the like caused by an external force being applied to the membrane electrode assembly (catalyst layer) in the thickness direction can be suppressed. Accordingly, a reduction in gas diffusion properties in a portion of the catalyst layer caused by the fibrous conductive members being bet and penetrating into the electrolyte membrane and the like can be suppressed. As a result, the output characteristics of the fuel cell can be enhanced. Furthermore, the possibility of an influence on the conductivity of the fibrous conductive members caused by bending of the fibrous conductive members, penetration of the fibrous conductive members into the electrolyte membrane, and the like is also eliminated. Even without an embedding prevention layer, the embedment of the end portions of the fibrous conductive members into the electrolyte membrane during transfer of the catalyst layer onto the electrolyte membrane can be suppressed.

The catalyst layer described above is, for example, a catalyst layer with a uniform thickness formed using a catalyst ink, which will be described later. Accordingly, the contact area between the gas diffusion layer and the catalyst layer can be sufficiently ensured, and an increase in resistance caused by the contact area being small can be suppressed. The expression "a catalyst layer with a uniform thickness" means that the difference (absolute value) between each of 10 measured values obtained when determining the thickness T of the catalyst layer (see FIG. 2), which will be described later, and the average value of the 10 measured values is 25% or less of the average value. At this time, among the 10 measured values, it is sufficient that 6 or more measured values have a difference with the average value of 25% or less.

It is preferable that the length $L_f$ of the fibrous conductive members and the thickness T of the catalyst layer satisfy the relational expression: $L_f/T \leq 3$. In this case, a catalyst layer in which the fibrous conductive members are inclined relative to the surface direction of the catalyst layer and the lengthwise direction of the fibrous conductive members, on average, matches the first direction can be easily formed. In this case, the fibrous conductive members can be easily inclined relative to the surface direction of the catalyst layer while the linearity of the fibrous conductive members is ensured, and thus gas diffusion properties in the thickness direction of the catalyst layer are further improved. From the viewpoint of further improving gas diffusion properties in the catalyst layer, it is more preferable that $L_f/T$ is 0.25 or more and 2.0 or less.

The length $L_f$ of the fibrous conductive members means average fiber length, and can be determined by arbitrarily extracting 10 fibrous conductive members from the catalyst layer and averaging the fiber lengths of the fibrous conductive members. The term "the fiber length of a fibrous conductive member" refers to the length of a straight line connecting one end and the other end of the fibrous conductive member.

The length $L_f$ of the fibrous conductive members is preferably 0.2 μm or more and 20 μm or less, and more preferably 0.5 μm or more and 10 μm or less. In this case, even in a thin catalyst layer (for example, with a thickness T of 10 μm or less), the fibrous conductive members can be easily inclined relative to the surface direction of the catalyst layer. Also, by using short fibrous conductive members with a length within the above-described range, opposite ends of the fibrous conductive members in the catalyst layer respectively coming into contact with the electrolyte membrane and the gas diffusion layer can be suppressed. As a result, the embedment of the end portions of the fibrous conductive members into the electrolyte membrane during transfer of the catalyst layer onto the electrolyte membrane and the penetration of the fibrous conductive members into the electrolyte membrane and the like in the event of an external force being applied to the membrane electrode assembly in the thickness direction of the membrane electrode assembly can be further suppressed.

The thickness T of the catalyst layer means average thickness, and can be determined by measuring the distance of a straight line connecting one main surface to the other main surface of the catalyst layer in the thickness direction of the catalyst layer at arbitrarily selected 10 points in a cross section of the catalyst layer, and averaging the obtained distances.

From the viewpoint of size reduction of the fuel cell, it is desirable that the thickness T of the catalyst layer is small. On the other hand, from the viewpoint of strength, it is preferable that the thickness T of the catalyst layer is not too small. The thickness T of the catalyst layer is, for example, 1 μm or more and 50 μm or less, and preferably 2 μm or more and 20 μm or less.

The inclination angle $\theta_c$ (see FIG. 2) of the fibrous conductive members relative to the surface direction of the catalyst layer is preferably 80° or less, and more preferably 70° or less. If the inclination angle $\theta_c$ is 80° or less, gas diffusion properties in the surface direction of the catalyst layer are further improved in addition to gas diffusion properties in the thickness direction of the catalyst layer. If the inclination angle $\theta_c$ is 70° or less, the bending of the fibrous conductive members and the penetration of the fibrous conductive members into the electrolyte membrane and the like caused by an external force being applied to the membrane electrode assembly in the thickness direction can be further suppressed.

Figure 2:
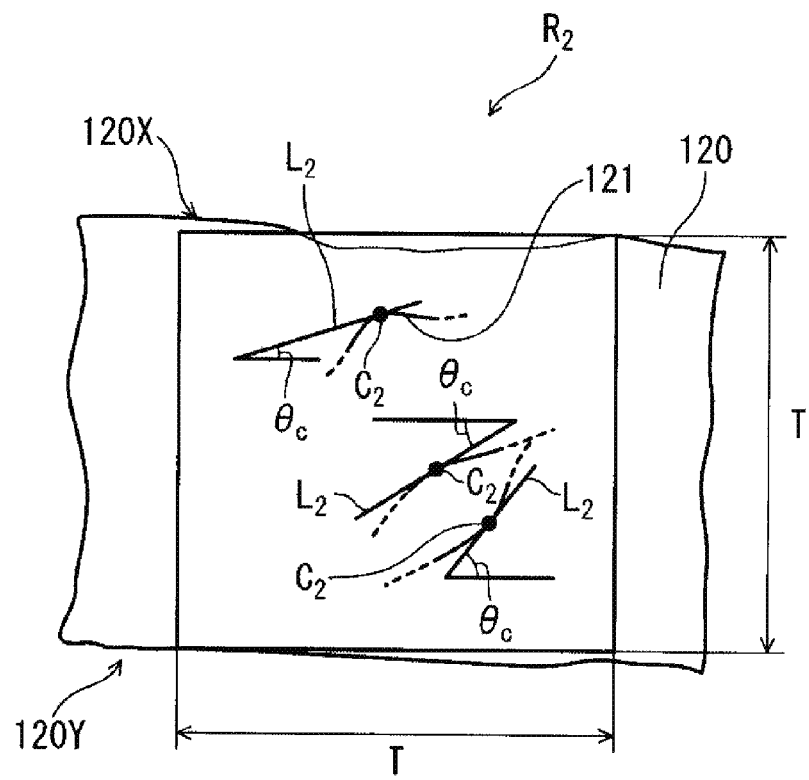
FIG. 2 is an illustrative diagram illustrating a method for calculating linearity parameter $L_p$ of fibrous conductive members and a method for calculating inclination angle $\theta_c$ of the fibrous conductive members, using a cross section of a catalyst layer.

The linearity parameter $L_p$ and the inclination angle $\theta_c$ of the fibrous conductive members are determined in the manner described below, by using FIG. 2. FIG. 2 is an illustrative diagram illustrating a method for calculating linearity parameter $L_p$ of fibrous conductive members and a method for calculating inclination angle $\theta_c$ of the fibrous conductive members, by using across section of a catalyst layer 120. FIG. 2 shows only a few fibrous conductive members 121.

First, an image of a cross section of a catalyst layer 120 is captured using a scanning electron microscope (SEM), the catalyst layer 120 having a first main surface 120X on the gas diffusion layer side and a second main surface 120Y on the electrolyte membrane side, and the cross section being taken along the thickness direction of the catalyst layer 120 and the first direction.

In an obtained SEM image, for example, a square region $R_2$ is defined, the square region $R_2$ being a square region in which, for example, 20 or more fibrous conductive members 121 can be observed and that has each side having a length corresponding to the thickness T of the catalyst layer 120. The region $R_2$ can be defined in the manner described below. First, a straight line is drawn along the thickness direction of the catalyst layer 120. A point of intersection of the straight line with the second main surface 120Y is taken as one of the vertices of a square that will be the region $R_2$. Next, two straight lines that each have a length T and are perpendicular to each other are drawn from this vertex, and other two straight lines are drawn so as to form a square together with the two straight lines drawn earlier.

Next, 10 fibrous conductive members are arbitrarily selected from among the fibrous conductive members 121 that can be observed in the region $R_2$. For each of the 10 fibrous conductive members 121, one end and the other end of an observable lengthwise portion are connected by a straight line, and the length $L_s$ of the straight line is measured. Also, the actual length $L_r$ of the observable lengthwise portion is measured. $L_s/L_f$ that is the ratio of $L_s$ relative to $L_r$ is defined as linearity parameter $L_p$.

In the manner as described above, three regions $R_2$ are defined such that they do not overlap each other. Then, for each of the three regions $R_2$, the linearity parameter $L_p$ of 10 fibrous conductive members 121 is obtained, and the average value of the linearity parameters $L_p$ of a total of 30 fibrous conductive members 121 is obtained. If the linearity parameter $L_p$ (average value) is 0.6 or more, it is determined that the linearity of the fibrous conductive members 121 is ensured. On the other hand, if the linearity parameter $L_p$ (average value) is less than 0.6, it is determined that the fibrous conductive members 121 are bent, and inclination angle θ, which will be described later, cannot be obtained.

After it has been confirmed from the above-described linearity parameter that the linearity of the fibrous conductive members is ensured, the inclination angle $θ_c$ of the fibrous conductive members can be determined in the manner described below by using FIG. 2.

For each of the 10 fibrous conductive members 121 arbitrarily selected in each of the three designated regions $R_2$, a tangent line $L_2$ is drawn at the midpoint C2 of an observable lengthwise portion. The angle (0° or more and 90° or less) formed by the tangent line $L_2$ and the first main surface 120X is defined as the inclination angle $θ_c$ of the fibrous conductive member 121, and the average value of the inclination angles $θ_c$ of a total of 30 fibrous conductive members 121 is determined. If the first main surface 120X has irregularities, a surface perpendicular to the thickness direction of the catalyst layer 120 or the smooth second main surface 120Y may be used as a reference for determining inclination angle $θ_c$.

In a cross section of the catalyst layer taken along the thickness direction of the catalyst layer and the first direction, the fibrous conductive members are not necessarily inclined in a unidirectional manner. However, from the viewpoint of improving gas diffusion properties in the catalyst layer, it is preferable that the fibrous conductive members are unidirectionally inclined in a cross section of the catalyst layer taken along the thickness direction of the catalyst layer and the first direction.

As used herein, the expression "the fibrous conductive members are unidirectionally inclined in a cross section of the catalyst layer taken along the thickness direction of the catalyst layer and the first direction" means that, in the cross section of the catalyst layer taken along the thickness direction of the catalyst layer and the first direction, the lengthwise direction of the fibrous conductive members, on average, matches a second direction. As used herein, the expression "the lengthwise direction of the fibrous conductive members, on average, matches a second direction" means that when the catalyst layer is viewed from a direction perpendicular to the direction of the cross section, an angle $θ_{d2}$ formed by a second reference line that extends in the second direction and the lengthwise direction of the fibrous conductive members is 30° or less.

The second reference line (second direction) is determined by using a total of 30 tangent lines $L_2$ obtained when determining the linearity parameter $L_p$ and the inclination angle $θ_c$ of the fibrous conductive members. Specifically, the orientations of a total of 30 tangent lines $L_2$ obtained are averaged, and the average orientation is defined as second direction, and a straight line that extends in the average orientation (second direction) is defined as second reference line $BL_2$.

The angle $θ_{d2}$ formed by the second reference line $BL_2$ extending in the second direction and the lengthwise direction of the fibrous conductive members when the catalyst layer is viewed from a direction perpendicular to the direction of the cross section is obtained in the manner described below.

For each of the 30 tangent lines $L_2$ obtained above, the angle (0° or more and 90° or less) formed by the reference line $BL_2$ and the tangent line $L_2$ obtained above is measured. The average value of the measured angles is defined as angle $θ_{d2}$. If the obtained angle $θ_{d2}$ is 30° or less, it is determined that the lengthwise direction of the fibrous conductive members, on average, matches the second direction.

The diameter $D_f$ of the fibrous conductive members is preferably 200 nm or less, more preferably 5 nm or more and 200 nm or less, and even more preferably 8 nm or more and 100 nm or less. In this case, the volume ratio of the fibrous conductive members in the catalyst layer can be reduced, the gas paths can be sufficiently ensured, and the gas diffusion properties can be further enhanced.

The diameter $D_f$ of the fibrous conductive members can be determined by arbitrarily selecting 10 fibrous conductive members from among the fibrous conductive members in the catalyst layer and averaging the diameters of the 10 fibrous conductive members. The term "diameter" refers to the length of a fibrous conductive member in a direction perpendicular to the lengthwise direction of the fibrous conductive member.

It is preferable that the length $L_f$ of the fibrous conductive members and the diameter $D_f$ of the fibrous conductive members satisfy the relational expression: $D_f/L_f<1$. In this case, good gas diffusion properties in the entire catalyst layer can be obtained sufficiently.

From the viewpoint of improving conductivity, it is more preferable that $D_f/L_f$ is 0.002 or more and less than 1.

Examples of the fibrous conductive members include carbon fibers such as vapor grown carbon fibers (VGCFs), carbon nanotubes (CNTs), and carbon nanofibers.

At least some of the catalyst particles are supported by the fibrous conductive members. It is preferable that the catalyst particles are also supported by particulate conductive members, which will be described below, in addition to the fibrous conductive members. The reason is that the catalyst particles can more easily come into contact with gas, which increases the efficiency of oxidation reaction or reduction reaction of the gas.

The catalyst particles are not particularly limited, and may be made of a catalyst metal such as an alloy or a metal elements selected from Sc, Y, Ti, Zr, V, Nb, Fe, Co, Ni, Ru, Rh, Pd, Pt, Os, Ir, lanthanoid-series elements, and actinoid-series elements. For example, the catalyst particles used in the anode may be made of a Pt—Ru alloy, or the like. The catalyst metal used in the cathode may be Pt, a Pt—Co alloy, or the like.

From the viewpoint of shortening the conductive path and further enhancing conductivity, it is preferable that the catalyst layer further contains particulate conductive members. The material of the particulate conductive members is not particularly limited and it is preferable to use carbon black because it has excellent conductivity. Examples of carbon black include acetylene black, Ketjen black, thermal black, furnace black, channel black, and the like. The particle size (or the length of a structure composed of a plurality of connected primary particles) is not particularly limited, and any particle size that is conventionally used in a catalyst layer for a fuel cell can be used.

The amount of the particulate conductive members in the catalyst layer is preferably 40 parts by mass or less relative to 100 parts by mass of a total of the fibrous conductive members and the particulate conductive members, more preferably 5 parts by mass or more and 35 parts by mass or less, and even more preferably 10 parts by mass or more and 30 parts by mass or less. In this case, conductivity can be enhanced while ensuring good gas diffusion properties in the entire catalyst layer.

From the viewpoint of improving reactivity in the catalyst layer, it is preferable that the catalyst layer further contains a proton conductive resin. In this case, the proton conductive resin covers at least some of the fibrous conductive members and the catalyst particles. Because the fibrous conductive members are inclined relative to the surface direction of the catalyst layer, an influence on the reactivity (proton conductivity) in the catalyst layer caused by the fibrous conductive members being bent, penetrating into the electrolyte membrane, and the like due to an external force being applied to the membrane electrode assembly in the thickness direction of the membrane electrode assembly can be suppressed.

The proton conductive resin is not particularly limited, and examples include a perfluorocarbon sulfonic acid-based polymer, a hydrocarbon-based polymer, and the like. Among these, it is preferable to use a perfluorocarbon sulfonic acid-based polymer or the like because it has excellent heat resistance and chemical stability. As the perfluorocarbon sulfonic acid-based polymer, for example, Nafion® can be used. The proton conductive resin may also cover at least some of the particulate conductive members.

The amount of the fibrous conductive members in the catalyst layer is preferably 15 parts by mass or more and 65 parts by mass or less relative to 100 parts by mass of a total of the catalyst particles, the particulate carbon material and the proton conductive resin, and more preferably 20 parts by mass or more and 55 parts by mass or less. The reason is that. Within this range, the fibrous conductive members can be easily brought into a desired state, and gas diffusion properties and the efficiency of electrochemical reaction can be easily increased.

The catalyst layer can be formed by, for example, applying a catalyst ink containing fibrous conductive members and catalyst particles onto the surface of an electrolyte membrane, and drying the catalyst ink. Alternatively, the catalyst ink may be applied to a transfer substrate sheet, and then dried to form a catalyst layer, and the catalyst layer formed on the substrate sheet may be transferred onto an electrolyte membrane. Because the fibrous conductive members are inclined relative to the surface direction of the catalyst layer, even without an embedding prevention layer being provided on the surface of the electrolyte membrane, the embedment of the fibrous conductive members into the electrolyte membrane during transfer of the catalyst layer can be suppressed. As the substrate sheet, it is preferable to use, for example, a sheet with a smooth surface made of polyethylene terephthalate (PE), polypropylene or the like.

The catalyst ink contains a dispersion medium in addition to the fibrous conductive members and the catalyst particles. As the dispersion medium, for example, water, ethanol, propanol, and the like can be used. The catalyst ink may further contain particulate conductive members, a proton conductive resin, and the like.

As the application method, it is preferable to use a screen printing method or a coating method that uses any type of coater such as a blade coater, a knife coater, or a gravure coater.

With the application method described above, the fibrous conductive members can be easily inclined, and the direction in which the fibrous conductive members are inclined can also be easily controlled. By applying the catalyst ink in one direction, a catalyst layer in which the fibrous conductive members are inclined relative to the surface direction of the catalyst layer and the lengthwise direction of the fibrous conductive members, on average, matches the first direction can be easily formed. In addition, by applying the catalyst ink in one direction, the fibrous conductive members can be easily inclined unidirectionally in a cross section of the catalyst layer taken along the thickness direction of the catalyst layer.

By setting the application amount and the application rate constant, a catalyst layer with a uniform thickness can be easily formed.

When forming the catalyst layer by applying the catalyst ink, it is preferable to adjust the length of the fibrous conductive members and the thickness of the catalyst layer such that UT satisfies 3 or less. In this case, the above-described catalyst layer can be easily formed. In particular, the fibrous conductive members can be easily inclined relative to the surface direction of the catalyst layer. The thickness of the catalyst layer can be adjusted by changing the application amount of the catalyst ink or the like.

The inclination angle $\theta_c$ of the fibrous conductive members can be adjusted by changing, for example, the length of the fibrous conductive members, and the application amount, application rate, viscosity and the like of the catalyst ink.

[Fuel Cell]

A fuel cell according to an embodiment of the present disclosure includes: a membrane electrode assembly; and a first separator and a second separator that sandwich the membrane electrode assembly. The membrane electrode assembly includes: an electrolyte membrane; and a first electrode and a second electrode that sandwich the electrolyte membrane. The first electrode includes a first catalyst layer and a first gas diffusion layer in this order from the electrolyte membrane side. The first catalyst layer is the catalyst layer described above. By incorporating the above-described catalyst layer, a fuel cell with excellent output characteristics can be obtained. One of the first electrode and the second electrode functions as an anode, and the other electrode functions as a cathode.

It is preferable that the first separator has a first gas flow path, and when the first separator is viewed from the stack direction of the membrane electrode assembly, the first direction matches the average flow path direction of the first gas flow path. The first gas flow path may have one flow path or a plurality of flow paths that are arranged in parallel.

As used herein, the expression "the first direction matches the average flow path direction of the first gas flow path" means that, when the first separator is viewed from the stack direction of the membrane electrode assembly, an angle $\theta_g$ formed by the first direction and the average flow path direction of the first gas flow path is 45° or less. The angle $\theta_g$ is preferably 30° or less, and more preferably 10° or less. The term "the average flow path direction of the first gas flow path" refers to a direction extending from one end (gas inlet) of the first gas flow path toward the other end (gas outlet) of the first gas flow path.

In the above-described catalyst layer, the lengthwise direction of the fibrous conductive members, on average, matches the first direction, and thus many voids are formed in the catalyst layer along the first direction. Also, the first direction matches the average flow path direction of the first gas flow path. Accordingly, gas is smoothly supplied from the first gas flow path into the catalyst layer, and excess gas is also discharged smoothly from the catalyst layer to the first gas flow path. Thus, gas diffusion properties in the surface direction of the catalyst layer are further improved.

From the viewpoint of improving gas diffusion properties in the surface direction of the catalyst layer, it is preferable that the first gas flow path has a plurality of first linear portions that are oriented in the first direction, and the proportion of the total length of the plurality of first linear portions relative to the total length of the first gas flow path is 80% or more and 100% or less.

In the case where the first gas flow path has a serpentine shape, the first gas flow path has a plurality of first linear portions that are oriented in the first direction and a plurality of first turn portions that connect the end portions of adjacent first linear portions. Gas flows in a serpentine manner through the plurality of first linear portions via the first turn portions. The first linear portions each may have one flow path or a plurality of flow paths that are arranged in parallel.

In the first catalyst layer, it is preferable that the fibrous conductive members are unidirectionally inclined such that the first gas diffusion layer-side end portions of the fibrous conductive members are located on the downstream side of the average flow path direction of the first gas flow path relative to the electrolyte membrane-side end portions of the fibrous conductive members. In this case, gas diffusion properties in the surface direction of the catalyst layer are further improved. Also, in the case where the first catalyst layer functions as a cathode catalyst layer, water produced in the catalyst layer flows along the gas flow direction and is easily discharged to the outside through the gas diffusion layer, and thus good gas diffusion properties can be maintained in the entire catalyst layer.

In the first catalyst layer, it is more preferable that the fibrous conductive members are unidirectionally inclined such that the first gas diffusion layer-side end portions of the fibrous conductive members are located on the downstream side of the first linear portions of the first gas flow path relative to the electrolyte membrane-side end portions of the fibrous conductive members.

Figure 3:
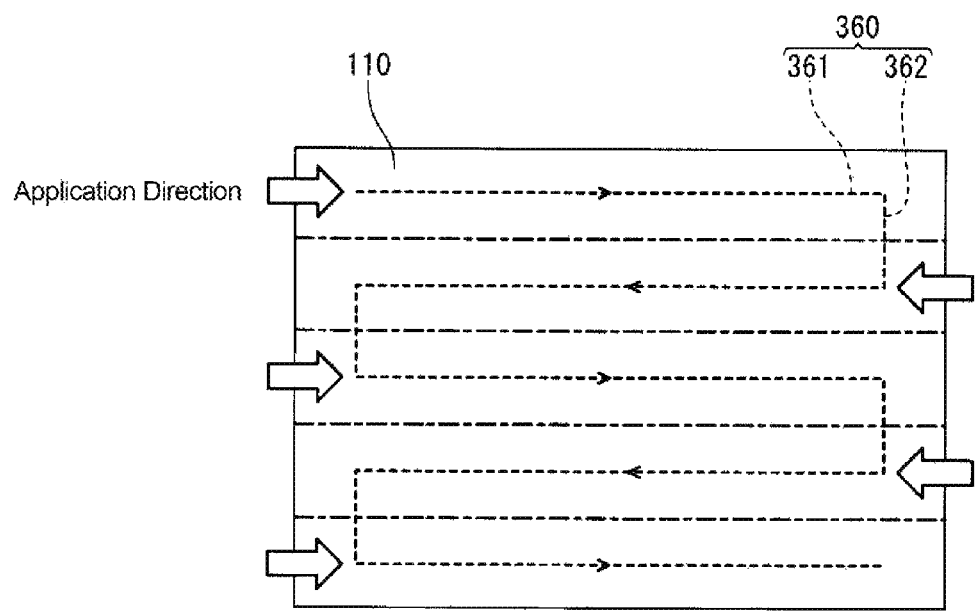
FIG. 3 is an illustrative diagram illustrating an example of the step of applying a catalyst ink.

Here, an example of the step of applying a catalyst ink that contains fibrous conductive members onto the surface of an electrolyte membrane in the case where a first separator that has a serpentine first gas flow path is used will be described with reference to FIG. 3. The broken line shown in FIG. 3 indicates a first gas flow path 360 when a stack in which a first catalyst layer, a first gas diffusion layer, and a first separator are disposed in this order on one surface of an electrolyte membrane 110 is viewed from the stack direction. The first gas flow path 360 includes a first linear portion 361 and a first turn portion 362. The arrows in the broken line indicate gas flow direction. The electrolyte membrane 110 includes a plurality of regions that are divided by dash-dotted lines, each of the plurality of regions including one first linear portion 361. When applying a catalyst ink that contains fibrous conductive members onto the surface of the electrolyte membrane 110 by using a coater or the like, as shown in FIG. 3, the direction in which the catalyst ink is applied to the electrolyte membrane 110 may be changed for each region such that the application direction of the catalyst ink matches the gas flow direction of the first linear portion 361. By doing so, in all of the first linear portions, the fibrous conductive members can be inclined such that the first gas diffusion layer-side end portions of the fibrous conductive members are located on the downstream side of the first linear portion of the first gas flow path relative to the electrolyte membrane-side end portions of the fibrous conductive members.

The second electrode includes a second catalyst layer and a second gas diffusion layer in this order from the electrolyte membrane side. The second separator has a second gas flow path. It is preferable that the catalyst layers of the present invention are used as the first catalyst layer and the second catalyst layer.

As the electrolyte membrane, a polymer electrolyte membrane is preferably used. As the material of the polymer electrolyte membrane, the polymer electrolytes listed as examples of the proton conductive resin can be used. The thickness of the electrolyte membrane is, for example, 5 to 30 µm.

The first gas diffusion layer and the second gas diffusion layer may have a structure with a substrate layer or a structure without a substrate layer. The structure with a substrate layer may be, for example, a structure that includes a substrate layer and a micro-porous layer that is provided on the catalyst layer-side surface of the substrate layer. As the substrate layer, a conductive porous sheet such as a carbon cloth or carbon paper can be used. The micro-porous layer may be made of a mixture of a water repellent resin such as fluorocarbon resin, a conductive carbon material and a proton conductive resin (polymer electrolyte), and the like.

It is sufficient that the first separator and the second separator are gas-tight, electron conductive and electrochemically stable, and the material of the first separator and the second separator is not particularly limited. As the material, it is preferable to use a carbon material, a metal material, and the like. The metal material may be covered by carbon. For example, each of the first separator and the second separator can be obtained by, for example, punching out a metal plate into a predetermined shape and performing a surface treatment on the obtained meal plate.

Figure 4:
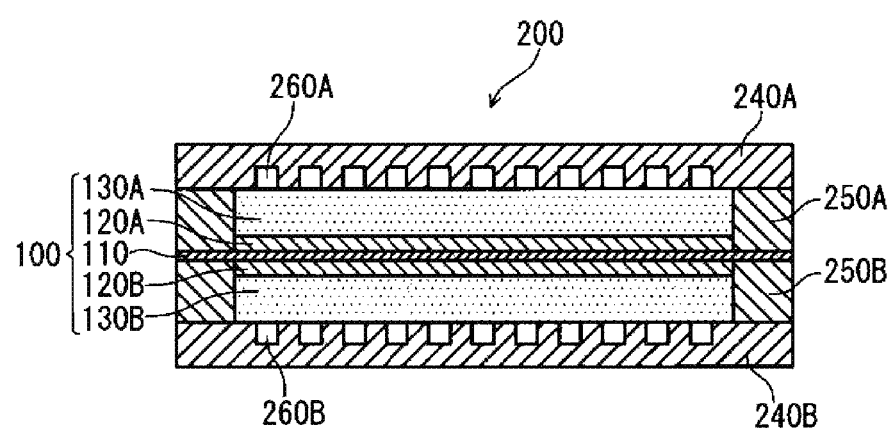
FIG. 4 is a cross sectional view schematically showing the structure of a unit cell included in a fuel cell according to an embodiment of the present disclosure.

Hereinafter, an example of the structure of a fuel cell according to the present embodiment will be described with reference to FIG. 4. FIG. 4 is a cross sectional view schematically showing the structure of a unit cell provided in the fuel cell according to the embodiment of the present disclosure. Ordinarily, a plurality of unit cells are stacked and provided in a fuel cell as a cell stack. For the sake of convenience, FIG. 4 shows only one unit cell.

A unit cell provided in a fuel cell 200 includes: an electrolyte membrane 110; and a first catalyst layer 120A and a second catalyst layer 120B that are disposed to sandwich the electrolyte membrane 110. The unit cell of the fuel cell 200 further includes: a first gas diffusion layer 130A and a second gas diffusion layer 130B that are disposed to sandwich the electrolyte membrane 110 via the first catalyst layer 120A and the second catalyst layer 120B, respectively; and a first separator 240A and a second separator 240B that are disposed to sandwich the electrolyte membrane 110 via the first gas diffusion layer 130A and the second gas diffusion layer 130B, respectively. One of the first catalyst layer 120A and the second catalyst layer 120B functions as an anode, and the other catalyst layer functions as a cathode. The electrolyte membrane 110 is larger in size than the first catalyst layer 120A and the second catalyst layer 120B, and thus the peripheral portion of the electrolyte membrane 110 extends beyond the first catalyst layer 120A and the second catalyst layer 120B. The peripheral portion of the electrolyte membrane 110 is sandwiched by a pair of sealing members 250A and 250B.

Figure 5:
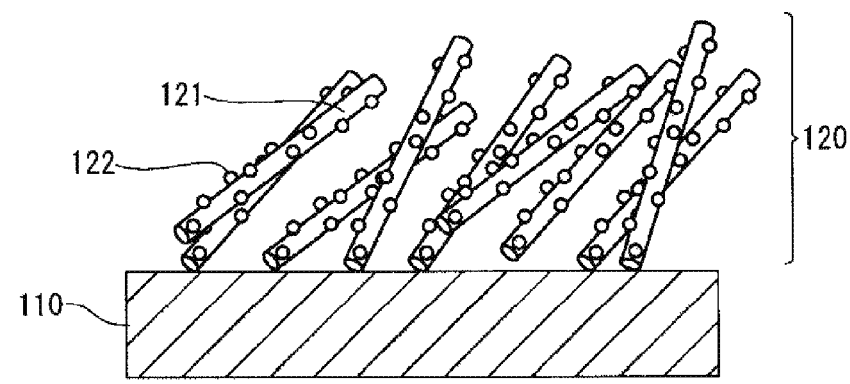
FIG. 5 is a diagram schematically showing the inside of a catalyst layer according to an embodiment of the present disclosure, as viewed from the surface direction (the direction perpendicular to the first direction) of the catalyst layer.
Figure 6:
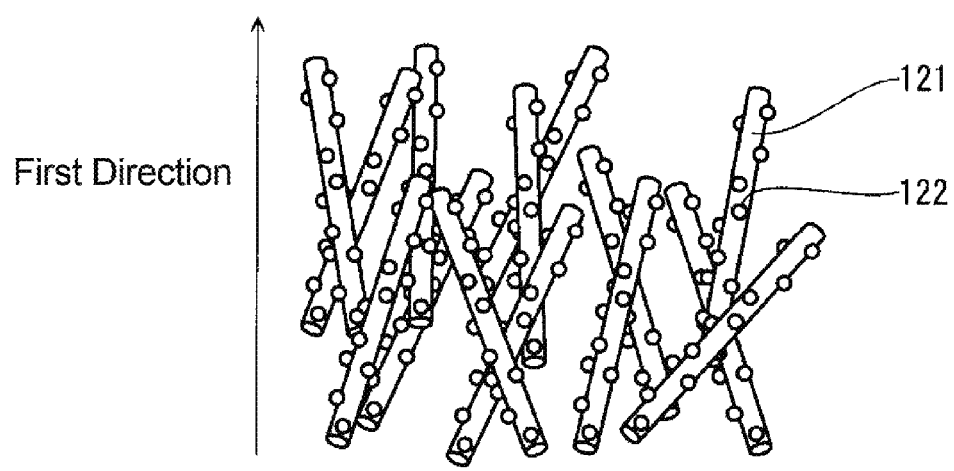
FIG. 6 is a diagram schematically showing the inside of the catalyst layer shown in FIG. 5, as viewed from the gas diffusion layer side.

At least one of the first catalyst layer 120A and the second catalyst layer 120B is a catalyst layer 120 shown in FIGS. 5 and 6. Here. FIG. 5 is a diagram schematically showing the inside of the catalyst layer 120, as viewed from the surface direction (the direction perpendicular to the first direction)

of the catalyst layer 120. In order to show that fibrous conductive members are inclined, for the sake of convenience, an electrolyte membrane 110 is also illustrated. FIG. 6 is a diagram schematically showing the inside of the catalyst layer 120 shown in FIG. 5, as viewed from the gas diffusion layer side.

As shown in FIGS. 5 and 6, the catalyst layer 120 includes fibrous conductive members 121 and catalyst particles 122. As shown in FIG. 5, the fibrous conductive members 121 are inclined relative to the surface direction of the electrolyte membrane 110. From the viewpoint of further improving gas diffusion properties in the catalyst layer, as shown in FIG. 5, it is preferable that, when the inside of the catalyst layer is viewed from the surface direction, the fibrous conductive members 121 are unidirectionally inclined. As shown in FIG. 6, the lengthwise direction of the fibrous conductive members 121, on average, matches the first direction. If one of the first catalyst layer 120A and the second catalyst layer 120B is not the above-described catalyst layer 120, a catalyst layer of a known material and a known configuration can be used.

In the present embodiment, a gas flow path 260A is formed on a surface of the first separator 240A to be in contact with the first gas diffusion layer 130A. On the other hand, on a surface of the second separator 240B to be in contact with the second gas diffusion layer 130B, a gas flow path 260B is formed. The shape of the gas flow paths is not particularly limited, and may be parallel, serpentine, or the like. In the case where the first separator 240A or the second separator 240B does not have the gas flow path 260A or 260B, a gas flow path is formed on one of the surfaces of the corresponding gas diffusion layer that faces the separator.

The sealing members 250A and 250B are made of an elastic material, and are provided to prevent a fuel and/or an oxidant from leaking out of the gas flow paths 260A and 260B. The sealing members 250A and 250B have, for example, frame-like shapes that respectively surround the peripheral portion of the first catalyst layer 120A and the peripheral portion of the second catalyst layer 120B in the shape of a loop. As the sealing members 250A and 250B, sealing members of a known material and a known configuration can be used.

Hereinafter, the invention according to the present disclosure will be described in further detail by way of examples. However, the invention according to the present disclosure is not limited to the examples given below.

Example 1

<Production of Membrane Electrode Assembly>

Fibrous conductive members supporting catalyst particles (Pt—Co alloy) were added to an appropriate amount of water and dispersed by stirring. CNTs (with an average diameter of 15 nm and an average fiber length of 5 μm) were used as the fibrous conductive members. At this time, the amount of the catalyst particles was 30 parts by mass, and the amount of the fibrous conductive members was 70 parts by mass relative to 100 parts by mass of a total of the catalyst particles and the fibrous conductive members. Next, an appropriate amount of ethanol was added to the obtained dispersion while stirring the dispersion, and thereafter, 56 parts by mass of proton conductive resin (Nafion®) was added to 70 parts by mass of the fibrous conductive members. The resulting mixture was stirred, and thereby, a catalyst ink for forming a cathode catalyst layer was prepared.

Separately, a catalyst ink for forming an anode catalyst layer was prepared in the same manner as the catalyst ink for forming a cathode catalyst layer, except that particulate conductive members (carbon black) were used instead of the fibrous conductive members (carbon nanotubes).

Next, a Nafion® membrane with a thickness of 15 μm was prepared as an electrolyte membrane. The catalyst ink for forming a cathode catalyst layer was applied to one surface of the electrolyte membrane by using a blade coater so as to have a uniform thickness, and dried. In this way, a cathode catalyst layer (with a thickness of 6 μm) was formed. At this time, the catalyst ink was applied in one direction from one of opposite sides of a rectangular electrolyte membrane toward the other side. The application amount of the catalyst ink was adjusted such that the thickness of the formed catalyst layer was 6 μm.

Next, the catalyst ink for forming an anode catalyst layer was applied to the other surface of the electrolyte membrane by spraying so as to have a uniform thickness, and dried. In this way, an anode catalyst layer (with a thickness of 6 μm) was formed. Frame-shaped sealing members were disposed so as to surround the anode catalyst layer and the cathode catalyst layer, respectively.

Two porous conductive carbon sheets were prepared as gas diffusion layers. The surface of one of the gas diffusion layers was brought into contact with the anode catalyst layer. The surface of the other gas diffusion layer was brought into contact with the cathode catalyst layer. In this way, a membrane electrode assembly was produced.

<Production of Unit Cell>

Bridge plates for guiding a fuel or an oxidant to the gas diffusion layers were disposed near manifolds formed in advance in an electrolyte membrane, and the electrolyte membrane was entirely sandwiched by a pair of flat stainless steel plates (separators), and a test unit cell A1 was thereby obtained.

The separators each having a parallel gas flow path were used. The parallel gas flow path had linear portions that included a plurality of gas flow paths extended in parallel from one of opposite sides of a separator toward the other side. Gas flows in parallel from one of opposite sides of the separator toward the other side. The proportion of the length of the linear portions relative to the total length of the gas flow path is 100%, and the average flow path direction of the gas flow path is the same as the lengthwise direction of the linear portions.

Also, on the cathode side, the catalyst layer and the separator were disposed such that the direction in which the catalyst ink was applied onto the electrolyte membrane was perpendicular to the gas flow direction of the gas flow path (linear portions).

The membrane electrode assembly obtained above was separately prepared, the cathode-side gas diffusion layer was removed from the membrane electrode assembly, and an image of the gas diffusion layer-side main surface of the cathode catalyst layer was captured using an SEM. In the SEM image, a first reference line (first direction) was determined using the above-described method, and it was confirmed that, when the cathode catalyst layer was viewed from a direction perpendicular to the surface direction of the cathode catalyst layer, the angle $\theta_{d1}$ formed by the first reference line extending in the first direction and the lengthwise direction of the fibrous conductive members was 30° or less. In other words, it was confirmed that the lengthwise direction of the fibrous conductive members, on average, matched the first direction.

The angle $\theta_g$ formed by the first direction and the average flow path direction of the gas flow path (the direction of the linear portions) was greater than 45°.

The membrane electrode assembly obtained above was separately prepared, and an image of a cross section of the membrane electrode assembly was captured using an SEM. It was confirmed, in the SEM image, that some catalyst particles were supported by fibrous conductive members. The linearity parameter $L_P$ of the fibrous conductive members obtained by using the above-described method was 0.6 or more, from which it was confirmed that the linearity of the fibrous conductive members was ensured. The inclination angle C of the fibrous conductive members relative to the surface direction of the cathode catalyst layer obtained by using the above-described method was 12°. The angle $\theta_{d2}$ obtained by using the above-described method was 30° or less, and fibrous conductive members inclined unidirectionally were observed in a cross section of the cathode catalyst layer taken along the thickness direction (first direction) of the cathode catalyst layer.

The thickness T of the cathode catalyst layer obtained by using the above-described method was 6 μm. It was also confirmed that the thickness of the catalyst layer obtained by using the above-described method was uniform. The length $L_f$ of the fibrous conductive members obtained by using the above-described method was 5 μm. From this, $L_f/T$ was calculated to be 5/6.

<Evaluation>

The power generation performance of the unit cell A1 of Example 1 was evaluated. Specifically, a fuel gas was supplied to the anode such that a utilization rate of 70% was achieved. The dew point of the fuel gas was about 80° C. Also, an oxidant gas was supplied to the cathode such that a utilization rate of 50% was achieved. The dew point of the oxidant gas (air) was about 80° C. Then, a load control apparatus was controlled such that a constant current flowed, and the current densities of the anode and the cathode relative to the electrode area were changed. The peak power density of the unit cell A1 at this time was measured. The peak power density is indicated as an index with the peak power density of a unit cell B1 of Comparative Example 1 being set to 100.

Example 2

On the cathode side, the catalyst layer and the separator were disposed such that the direction along which the catalyst ink was applied onto the electrolyte membrane matched the gas flow direction of the gas flow path (linear portions). By doing so, the fibrous conductive members were unidirectionally inclined such that the gas diffusion layer-side end portions of the fibrous conductive members were located on the downstream side of the gas flow path (linear portions) relative to the electrolyte membrane-side end portions of the fibrous conductive members. A unit cell A2 was produced in the same manner as in Example 1, except that the above-described changes were made, and the obtained unit cell was evaluated.

The angle $\theta_g$ formed by the first direction and the average flow path direction of the gas flow path (the direction of the linear portions) was 10° or less, and the first direction matched the average flow path direction of the gas flow path.

Comparative Example 1

A unit cell B1 was produced in the same manner as in Example 1, except that the cathode catalyst layer was formed using a spray method, and the obtained unit cell was evaluated.

The cathode gas diffusion layer was removed from the obtained membrane electrode assembly, and an image of the gas diffusion layer-side main surface of the catalyst layer was captured using an SEM. Using the above-described method, a first reference line extending in the first direction was determined, and the angle $\theta_{d1}$ formed by the first reference line extending in the first direction and the lengthwise direction of the fibrous conductive members when the catalyst layer was viewed from a direction perpendicular to the surface direction of the catalyst layer was determined. As a result, it was confirmed that the angle $\theta_{d1}$ was greater than 30°, and the lengthwise direction of the fibrous conductive members, on average, did not match the first direction. The inclination angle $\theta_c$ obtained by using the above-described method was 25°.

The evaluation results are shown in Table 1.

TABLE 1

| Cell No. | | Arrangement of catalyst layer and separator on cathode side | Angle $\theta_{d1}$ (°) | $L_f/T$ | Inclination angle $\theta_c$ (°) | Peak power density (index) |
|---|---|---|---|---|---|---|
| Comparative Example 1 | B1 | — | Greater than 30° | 5/6 | 25 | 100 |
| Example 1 | A1 | Application direction of catalyst ink onto electrolyte membrane is perpendicular to gas flow direction of gas flow path | 30° or less | 5/6 | 12 | 103 |
| Example 2 | A2 | Application direction of catalyst ink onto electrolyte membrane matches gas flow direction of gas flow path | 30° or less | 5/6 | 12 | 109 |

The unit cells A1 and A2 of Examples 1 and 2 exhibited high peak power densities because gas diffusion properties in the catalyst layer were improved as compared with the unit cell B1 of Comparative Example 1. In particular, the unit cell A2 of Example 2 exhibited excellent output characteristics.

INDUSTRIAL APPLICABILITY

The fuel cell according to the present disclosure is suitable for use in a power supply for a stationary home cogeneration system, or a vehicle power supply. The invention according to the present disclosure is suitable for use in a polymer electrolyte fuel cell, but the application is not limited thereto. The invention according to the present disclosure is applicable to fuel cells in general.

REFERENCE SIGNS LIST

100 Membrane Electrode Assembly
110 Electrolyte Membrane
120 Catalyst Layer
120A First Catalyst Layer 120B Second Catalyst Layer
120X First Main Surface
120Y Second Main Surface
121 Fibrous Conductive Member
122 Catalyst Particle
130A First Gas Diffusion Layer
130B Second Gas Diffusion Layer
200 Fuel Cell
240A First Separator
240B Second Separator
250A, 250B Sealing Member
260A, 260B Gas Flow Path
360 First Gas Flow Path
361 First Linear Portion
362 First Turn Portion
A1, A2, B1 Unit Cell

The invention claimed is:

1. A method for producing a catalyst layer for a fuel cell comprising:
preparing a catalyst ink;
applying the catalyst ink onto a surface of an electrolyte membrane, and drying the catalyst ink to form the catalyst layer, or,
applying the catalyst ink to a transfer substrate sheet, then drying the ink to form the catalyst layer, and transferring the catalyst layer onto a surface of an electrolyte membrane,
the catalyst ink comprising:
fibrous conductive members;
a proton conductive resin; and
catalyst particles, wherein:
the fibrous conductive members are inclined relative to a surface direction of the catalyst layer,
a length $L_f$ of the fibrous conductive members and a thickness T of the catalyst layer satisfy the following relational expression: $L_f/T \leq 3$, and
a lengthwise direction of the fibrous conductive members, on average, matches a first direction.

2. The method for producing a catalyst layer for a fuel cell in accordance with claim 1, wherein, when the catalyst layer is viewed from a direction perpendicular to the surface direction, an average angle formed by a reference line that extends in the first direction and the lengthwise direction of the fibrous conductive members is 30° or less.

3. A method for producing a fuel cell comprising:
preparing a membrane electrode assembly; and
preparing a first separator and a second separator that sandwich the membrane electrode assembly,
wherein the membrane electrode assembly includes: an electrolyte membrane; and a first electrode and a second electrode that sandwich the electrolyte membrane in a stack direction,
the first electrode includes a first catalyst layer and a first gas diffusion layer in this order from the electrolyte membrane side, and
the first catalyst layer is the catalyst layer produced in accordance with claim 1.

4. The method for producing a fuel cell in accordance with claim 3, wherein:
the first separator has a first gas flow path, and when viewed from the stack direction of the membrane electrode assembly, the first direction matches an average flow path direction of the first gas flow path.

5. The method for producing a fuel cell in accordance with claim 4, wherein:
the first gas flow path includes a plurality of first linear portions that are oriented in the first direction, and
a proportion of a total length of the plurality of first linear portions relative to a total length of the first gas flow path is 80% or more and 100% or less.

6. The method for producing a fuel cell in accordance with claim 5,
wherein, in the first catalyst layer, the fibrous conductive members are unidirectionally inclined such that first gas diffusion layer-side end portions of the fibrous conductive members are located on a downstream side of the average flow path direction of the first gas flow path relative to electrolyte membrane-side end portions of the fibrous conductive members.

7. The method for producing a catalyst layer for a fuel cell in accordance with claim 1, comprising applying the catalyst ink onto a surface of an electrolyte membrane, and drying the catalyst ink to form the catalyst layer.

* * * * *